US012565383B2

(12) United States Patent
Boriack et al.

(10) Patent No.: US 12,565,383 B2
(45) Date of Patent: Mar. 3, 2026

(54) SPROCKET SHIELD ASSEMBLY FOR FEEDER OF AGRICULTURAL VEHICLE

(71) Applicant: CNH Industrial America LLC, New Holland, PA (US)

(72) Inventors: Cale Boriack, Lititz, PA (US); Trevor Book, Lititz, PA (US); Lyle Beidler, Akron, PA (US); Nathan E. Isaac, Lancaster, PA (US); Stijn Bailliu, Eernegem (BE); Bjorn Depoortere, Zwevezele (BE)

(73) Assignee: CNH Industrial America LLC, New Holland, PA (US)

( * ) Notice: Subject to any disclaimer, the term of this patent is extended or adjusted under 35 U.S.C. 154(b) by 644 days.

(21) Appl. No.: 18/087,090

(22) Filed: Dec. 22, 2022

(65) Prior Publication Data

US 2024/0206390 A1     Jun. 27, 2024

(51) Int. Cl.
B65G 23/06          (2006.01)

(52) U.S. Cl.
CPC .... B65G 23/06 (2013.01); *B65G 2812/02108* (2013.01)

(58) Field of Classification Search
CPC .......... B65G 23/06; B65G 2812/02108; A01B 71/08; A01D 61/008; A01D 61/04
See application file for complete search history.

(56)          References Cited

U.S. PATENT DOCUMENTS

| | | | |
|---|---|---|---|
| 3,885,471 A | | 5/1975 | Morine et al. |
| 5,232,068 A | * | 8/1993 | Bandy, Jr. .............. B65G 45/04 |
| | | | 184/6 |
| 5,389,044 A | * | 2/1995 | Bandy, Jr. ............... F16H 55/12 |
| | | | 474/96 |

(Continued)

FOREIGN PATENT DOCUMENTS

| | | |
|---|---|---|
| CN | 200990785 Y | 12/2007 |
| CN | 105557210 A | 5/2016 |

(Continued)

OTHER PUBLICATIONS

Extended European Search Report for EP Application No. 23218751.8 dated May 8, 2024 (seven pages).

*Primary Examiner* — Arpad Fabian-Kovacs
(74) *Attorney, Agent, or Firm* — Buchanan Ingersoll & Rooney PC

(57)          ABSTRACT

A feederhouse for an agricultural vehicle includes an assembled driveshaft having a shaft and at least one sprocket that is rotationally fixed to the shaft. A shield assembly is positioned adjacent the sprocket, wherein the shield assembly includes two components including a top component and a bottom component. The top component includes a first mating surface and a first wall. The bottom component includes a second mating surface and a second wall. When the two components are connected together by joining the first mating surface to the second mating surface, the two components form a first opening through which the shaft is positioned. A bearing component is configured to bear on (Continued)

both the first wall and the second wall for urging the first mating surface toward the second mating surface in order to limit the top component from separating from the bottom component.

15 Claims, 7 Drawing Sheets

(56)                   References Cited

U.S. PATENT DOCUMENTS

| | | | | | |
|---|---|---|---|---|---|
| 6,227,354 | B1 * | 5/2001 | Howden | ................ | B65G 23/06 |
| | | | | | 198/837 |
| 6,607,074 | B2 * | 8/2003 | Klabisch | ................ | B65G 39/12 |
| | | | | | 198/834 |
| 6,922,983 | B2 | 8/2005 | Gryspeerdt | | |
| 7,146,790 | B2 | 12/2006 | Duquesne et al. | | |
| 8,790,200 | B2 * | 7/2014 | Boissonneault | ...... | F16H 57/035 |
| | | | | | 474/146 |
| 10,390,485 | B2 | 8/2019 | Heyns et al. | | |
| 11,441,666 | B2 * | 9/2022 | Boriack | ............... | A01D 61/008 |

| | | | | | |
|---|---|---|---|---|---|
| 2012/0048687 | A1 * | 3/2012 | Boyd | ..................... | A01D 75/18 |
| | | | | | 198/832 |
| 2017/0258009 | A1 * | 9/2017 | Heyns | ..................... | A01D 61/04 |
| 2021/0231208 | A1 | 7/2021 | Boriack et al. | | |
| 2023/0118006 | A1 * | 4/2023 | Beidler | .................. | A01D 61/04 |
| | | | | | 198/860.3 |

FOREIGN PATENT DOCUMENTS

| | | | | | |
|---|---|---|---|---|---|
| CN | 206547360 | U | 10/2017 | | |
| CN | 111328556 | A | 6/2020 | | |
| EP | 3213625 | A1 * | 9/2017 | ............ | A01D 41/16 |
| EP | 3289854 | A1 * | 3/2018 | ............ | B65G 23/06 |
| EP | 3381268 | A1 * | 10/2018 | ............ | B65G 23/06 |
| EP | 4124234 | A1 * | 2/2023 | ............ | A01F 12/10 |
| EP | 4165980 | A1 | 4/2023 | | |
| EP | 4388857 | A1 * | 6/2024 | .......... | A01D 61/008 |
| JP | 10210844 | A | 8/1998 | | |
| JP | 3445123 | B2 | 9/2003 | | |
| WO | 2016194587 | A1 | 12/2016 | | |
| WO | 2022141981 | A1 | 7/2022 | | |
| WO | 2022141995 | A1 | 7/2022 | | |

* cited by examiner

SPROCKET SHIELD ASSEMBLY FOR FEEDER OF AGRICULTURAL VEHICLE

FIELD OF THE INVENTION

The present invention relates to agricultural vehicles. More specifically, the present invention relates to a feeder assembly for an agricultural vehicle, such as a combine harvester. More specifically, the present invention relates to a sprocket shield assembly for a feeder assembly.

BACKGROUND OF THE INVENTION

As is described in U.S. Pat. No. 10,390,485 to CNH America LLC (the '485 Patent), which is incorporated by reference in its entirety and for all purposes, agricultural feeders can include a chain engaged with teeth of a sprocket mounted on a rotating driveshaft. As the shaft rotates, the sprocket also rotates and the teeth of the sprocket engaged with the chain cause rotation of the chain. The chain can engage the teeth of two sprockets to form an endless chain between the two sprockets, with the portion of the chain between the two sprockets moving in a linear, rather than rotational, direction. Paddles or other types of conveying elements can be driven by the chain and contact crop material to convey the crop material in the linear direction before rotating about the sprockets at each end of the endless chain. Rotational movement of the shaft to continuously drive the chain and connected conveying elements to linearly move crop material across the feeder.

One particular problem with various feeders is that fed material or debris can become wrapped, impacted or accumulated on the sprockets or shaft rotating the sprockets, as well as under the chain. Material that accumulates on the shaft and/or sprocket can cause friction, requiring more power to rotate the shaft. Further, when material accumulates under the chain during rotation, the effective diameter of the chain can be increased such that the teeth of the sprockets do not engage every link in the chain as the chain is driven by the sprockets. Such an occurrence of the chain skipping one or more teeth of the sprockets may be referred to as "chain jumping," and may reduce the durability of the chain.

The '485 Patent describes a shield assembly mounted about the driveshaft that reduces the possibility of material and debris wrapping, impacting, and/or accumulating on the sprockets. The process of assembling the shield assembly described in the '485 Patent into a feeder may be characterized as labor intensive. Described herein is a different shield assembly that has been found to be easier to assemble than the shield assembly of the '485 Patent.

SUMMARY OF THE INVENTION

According to one aspect of the invention, a feederhouse for an agricultural vehicle includes an assembled driveshaft comprising a shaft and at least one sprocket that is rotationally fixed to said shaft. A shield assembly is positioned adjacent the sprocket. The shield assembly includes two components comprising a top component and a bottom component. The top component includes a first mating surface and a first wall. The bottom component includes a second mating surface and a second wall. When the two components are connected together by joining the first mating surface to the second mating surface, the two components form a first opening through which the shaft is positioned. A bearing component is configured to bear on both the first wall and the second wall for urging the first mating surface toward the second mating surface in order to limit the top component from separating from the bottom component.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

DETAILED DESCRIPTION OF THE INVENTION

Figure 1:
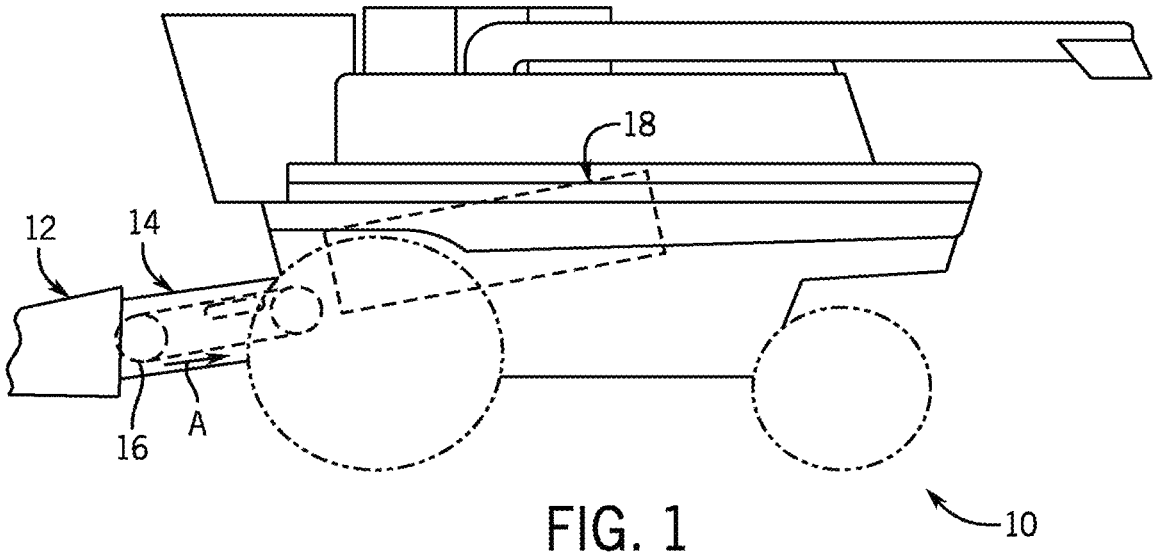
FIG. 1 is a simplified side elevational representation of an agricultural combine including a feeder.

Corresponding reference characters indicate corresponding parts throughout the several views. The exemplification set out herein illustrates an embodiment of the invention, in one form, and such exemplification is not to be construed as limiting the scope of the invention in any manner.

Inasmuch as various components and features of harvesters are of well-known design, construction, and operation to those skilled in the art, the details of such components and their operations will not generally be discussed in significant detail unless considered of pertinence to the present invention or desirable for purposes of better understanding.

In the drawings, like numerals refer to like items, certain elements and features may be labeled or marked on a representative basis without each like element or feature necessarily being individually shown, labeled, or marked, and certain elements are labeled and marked in only some, but not all, of the drawing figures.

The terms "forward" (or fore) and "rearward" (or rear or aft) when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. The terms "upstream" and "downstream" are determined with reference to the crop flow stream arrows shown in FIG. 1.

FIG. 1 depicts an agricultural combine 10 including a representative header 12 for cutting and harvesting crops, and a feeder 14 connected to the header 12 including a rotatable feeder conveyor 16 for conveying the crops to a rotatable threshing mechanism 18 of combine 10, as generally denoted by arrow A.

Figure 2:
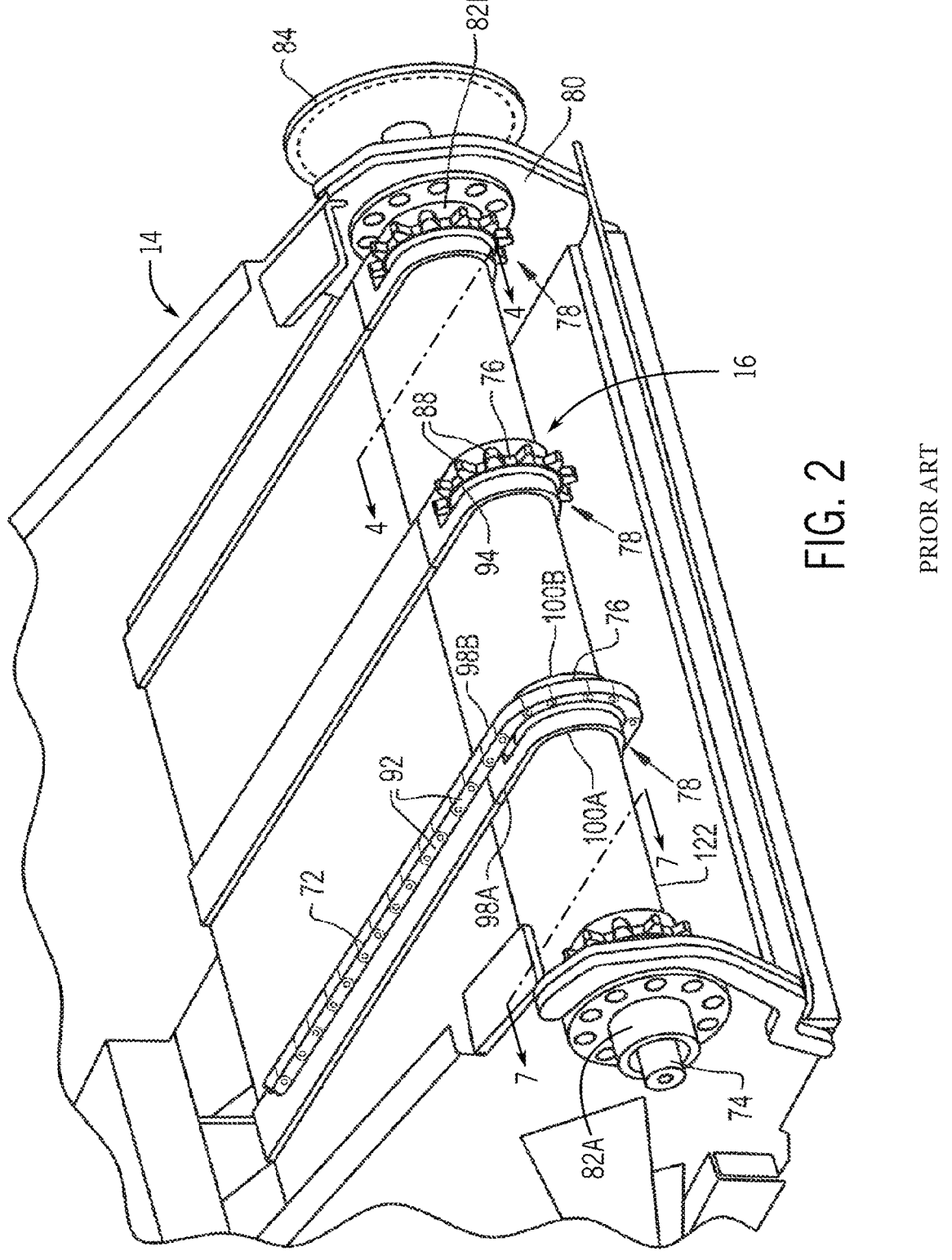
FIG. 2 is an enlarged, simplified perspective view of the feeder of FIG. 1.
Figure 3:
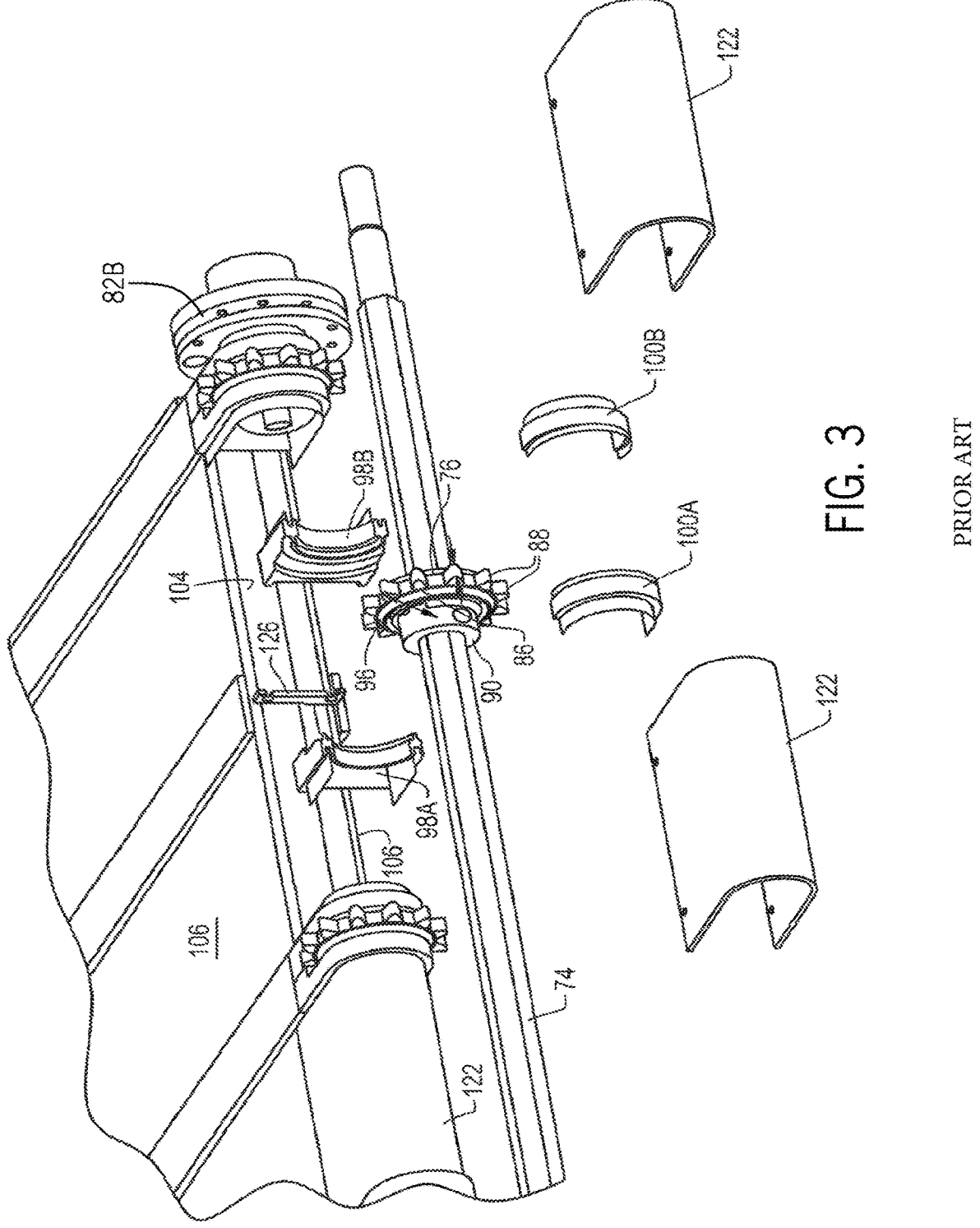
FIG. 3 is a partially exploded view of the feeder shown in FIG. 2.

Turning now to FIGS. 2 and 3, those figures depict the feeder 14. The feeder 14 includes a frame 80 (or housing) and the conveyor 16 mounted to frame 80 for rotating a chain 72. Conveyor 16 includes a driveshaft 74, a plurality of sprockets 76 (four shown) fixed to the driveshaft 74, and four shield assemblies 78 (also referred to as an anti-wrap). Each shield assembly 78 is mounted covers at least a portion of a respective sprocket 76. The shaft 74 is rotatably mounted to frame 80 of the feeder 14 by bearings 82A and 82B. Shaft 74 can be rotated by connection to a driven gear 84, for example. The shaft 74 can also be rotated by the chain 72 engaging the sprocket 76, with the chain 72 being rotated by a different sprocket or other element. Other means for rotating shaft 74 are known.

A plurality of curved shields 122 abut against a wall 104 of frame 80 that extends between the side walls of the frame 80. Each shield 122 is positioned between two adjacent shield assemblies 78 to prevent material ingress into the space between the wall 104 and surfaces 106. Brackets 126 are fixed to wall 104. The shield assemblies 78 are supported on the brackets 126.

The sprocket 76 can include an annular main sprocket body 86 with multiple radially extending teeth 88 extending from the circumference of the sprocket body 86 and a sprocket hub 90 extending transversely from one or both faces of the sprocket body 86. The sprocket body 86 and sprocket hub 90 have a bore formed therethrough that passes over the shaft 74. The bore is shaped to engage the shaft 74 so that rotation of the shaft 74 also causes rotation of the sprocket 76, or vice versa. The longitudinal axis of shaft 74 defines an axis of rotation of the sprocket 76. As shown, the teeth 88 of the sprocket 76 are spaced about the circumference of the sprocket body 86 so each tooth 88 engages one link 92 of the chain 72 during rotation of the sprocket 76, with the number and placement of teeth 88 on the sprocket 76 being chosen to engage each link 92 of the chain 72 as the sprocket 76 rotates and the links 92 rotate about the sprocket 76. Engaging each link 92 of the chain 72 with a tooth 88 of the sprocket 76 as the sprocket 76 and chain 72 rotate allows for smooth operation of the chain 72 and any conveying elements that might be connected to the chain 72, such as slats or paddles.

The shield assembly 78 can cover almost an entirety of the sprocket 76, except for some of the teeth 88 that are exposed for engaging the chain 72. The shape of the shield assembly 78 allows all of the teeth 88 of the sprocket 76 to rotate through the shield assembly 78 during a full 360-degree rotation of the sprocket 76 while also preventing ingress of material into the shield assembly 78 and preventing the chain 72 from rotating within the shield assembly 78.

The shield assembly 78 can be formed as two or more separable components. As shown in FIG. 3, the shield assembly 78 can include four components: a front left component 98A, a front right component 98B, a rear left component 100A, and a rear right component 100B. It should be appreciated that the terms "front," "rear," "right," and "left" are used to designate relative positions of the components 98A, 98B, 100A, 100B in the context of FIGS. 2-3, and should not be interpreted as limiting any particular orientation of the components 98A, 98B, 100A, 100B.

As can be seen in FIG. 3, the front left component 98A and front right component 98B can be constructed identically and the rear left component 100A and rear right component 100B can also be constructed identically, with the front right component 98B being flipped relative to the orientation of the front left component 98A and the rear right component 100B being flipped relative to the orientation of rear left component 100A. The front left component 98A and rear left component 100A can be mounted on and cover the sprocket hub 90 and the front right component 98B and rear right component 100B can be placed on the opposite side of the sprocket 76, with the components 98A, 98B, 100A, 100B collectively covering almost an entirety of the sprocket 76.

Further details of the shield assembly 78 are described in the '485 Patent.

Turning now to FIGS. 4-9, the shield assemblies 150 and 152 described hereinafter may be used with feeder 14 as a replacement for the shield assemblies 78. It should be understood that all of details of FIGS. 1-3 apply to FIGS. 4-9 unless otherwise noted.

In the feeder embodiment of FIGS. 4-9, feeder 14 includes a total of four shield assemblies 150/152 (i.e., two shield assemblies 150 and two shield assemblies 152). Shield assemblies 150 are positioned on sprockets 76 that are not positioned adjacent bearings 82A and 82B. Shield assemblies 152 are positioned on the sprockets 76 that are positioned adjacent bearings 82A and 82B. It should be understood that the number of sprockets 76 and their shield assemblies 150/152 can vary.

Figure 4:
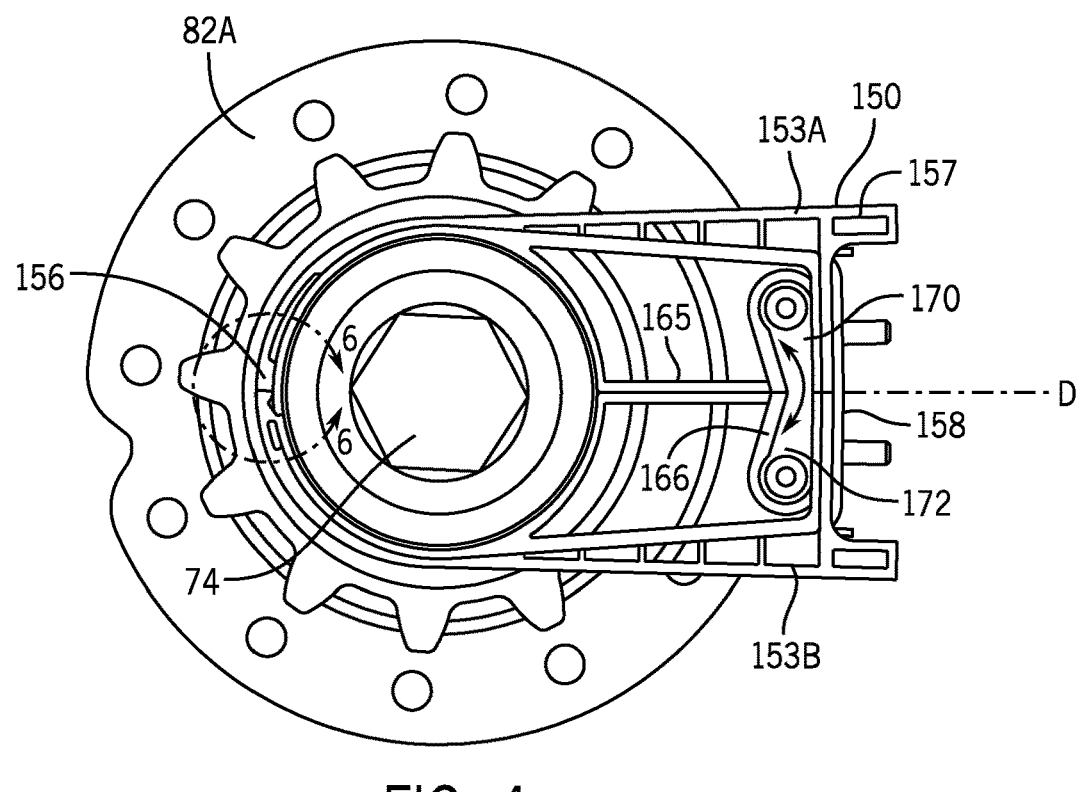
FIG. 4 is a side view of the feeder of FIG. 2 taken along the lines 4-4 in FIG. 2 and with various components omitted for clarity, with the exception that FIG. 4 depicts an alternative shield assembly.
Figure 5:
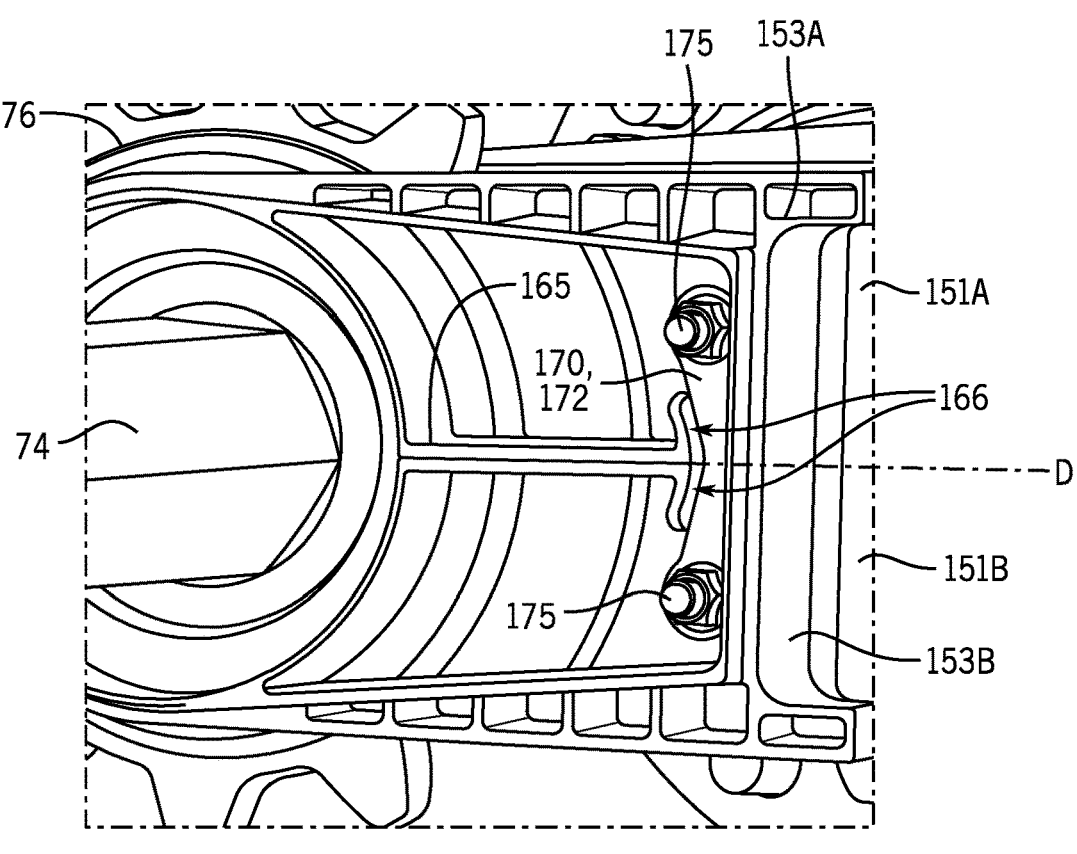
FIG. 5 is a view of FIG. 4 shown slightly rotated.

Referring now to shield assemblies 150 shown in FIGS. 4 and 5, each shield assembly 150 includes a top left component 151A, a bottom left component 151B, a top right component 153A, and a bottom right component 153B. A recess is formed between left component half 151 and right component half 153 for accommodating sprocket 76 (similar to that shown in FIG. 2). Components 151A and 153A may be substantial mirror images of each other along a vertical mirror plane, and, similarly, components 151B and 153B may be substantial mirror images of each other along a vertical mirror plane. Also, components 151A and 151B may be substantial mirror images of each other along a horizontal mirror plane, and, similarly, components 153A and 153B may be substantial mirror images of each other along a horizontal mirror plane.

Each component 151/153 has a semi-circular recess for accommodating a portion of a sprocket 76 and/or shaft 74.

Figure 6:
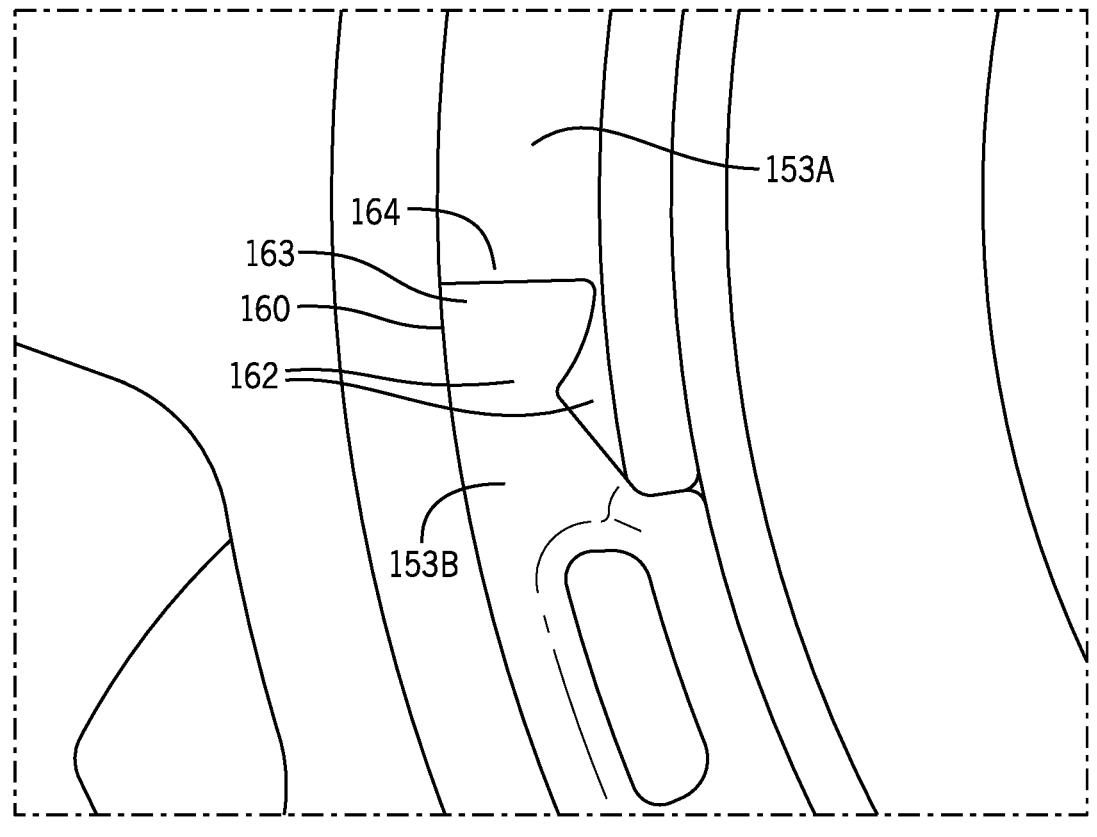
FIG. 6 is a detailed view of FIG. 4.

Each shield assembly 150 has a rear face 156 and a front face 158. As best shown in FIG. 6, at the rear face 156 of shield assembly 150, the components 153A and 153B are mounted to each other by a hinge joint 160. Specifically, component 153A and 153B have mating and interlocking V-shaped ramp surfaces 162. And the end of component 153B includes a projection 163 that fits within a complimentary recess 164 formed in component 153A. The hinge joint 160 holds together the rear ends of components 153A and 153B. Although not explicitly shown, components 151A and 151B have a similar hinge joint at the rear face 156.

As best shown in FIG. 4, the components 153A and 153B contact each other at horizontal mating surfaces 165 that extend along horizontal axis D. Each component 153A and 153B has an angled wall 166 extending from the mating surface 165. An acute angle is defined between the wall 166 of component 153A and mating surface 165. Similarly, an acute angle is defined between the angled wall 166 of component 153B and mating surface 165. In an assembled state of components 153A and 153B, the walls 166 of those components form a V-shaped or ramped surface. Stated differently an external angle (see double arrow in FIG. 4) defined between the walls 166 is greater than 180 degrees. Although not explicitly shown, components 151A and 151B may have similar angled walls 166. Also, although not shown, walls 166 do not have to be straight, and could be curved, if so desired. Also, the walls 166 do not have to intersect their respective mating surfaces, and could be spaced apart from the mating surfaces.

A tie strap 170 is positioned against the V-shaped or ramped surface formed by the adjacent walls 166 of components 153A and 153B. The side 172 of tie strap 170 facing walls 166 has a complimentary V-shaped or ramped surface. Bearing engagement between tie strap 170 and walls 166 prevents, or substantially limits, the components 153A and 153B from separating from each other at the mating surface 165. Fasteners 175 are positioned through holes in the components 151/153 and tie straps 170 (one tie strap per side of assembly 150). A nut is mounted to the end of each fastener 175, as shown in FIG. 5, to fix the components of assembly 150 together.

The tie strap 170 is not limited to being a tie, a strap or a tie strap, or being composed of any particular material. Generally speaking, the tie strap is a component that is shaped bears on both the components 153A and 153B to prevent, or substantially limit, the components 153A and 153B from separating from each other at the mating surface 165. Thus, the tie strap may alternatively be referred to herein as a bearing component.

Each component of shield assembly 150 includes a flange 157 extending from the front face 158. The front face 158 of shield assembly 150 may include connection surfaces, mating surfaces, connectors, pins, clips, fasteners, etc. that are configured for mounting to a connector on wall 104, such as bracket 126. Numerous ways for mounting shield assembly 150 to wall 104 are envisioned.

The mating shield component halves 151A and 151B of shield assembly 150 are divided along a horizontal axis D, instead of being divided along a vertical axis like that which is shown in FIG. 3. Similarly, the mating shield component halves 153A and 153B of shield assembly 150 are also divided along a horizontal axis D.

Figure 7:
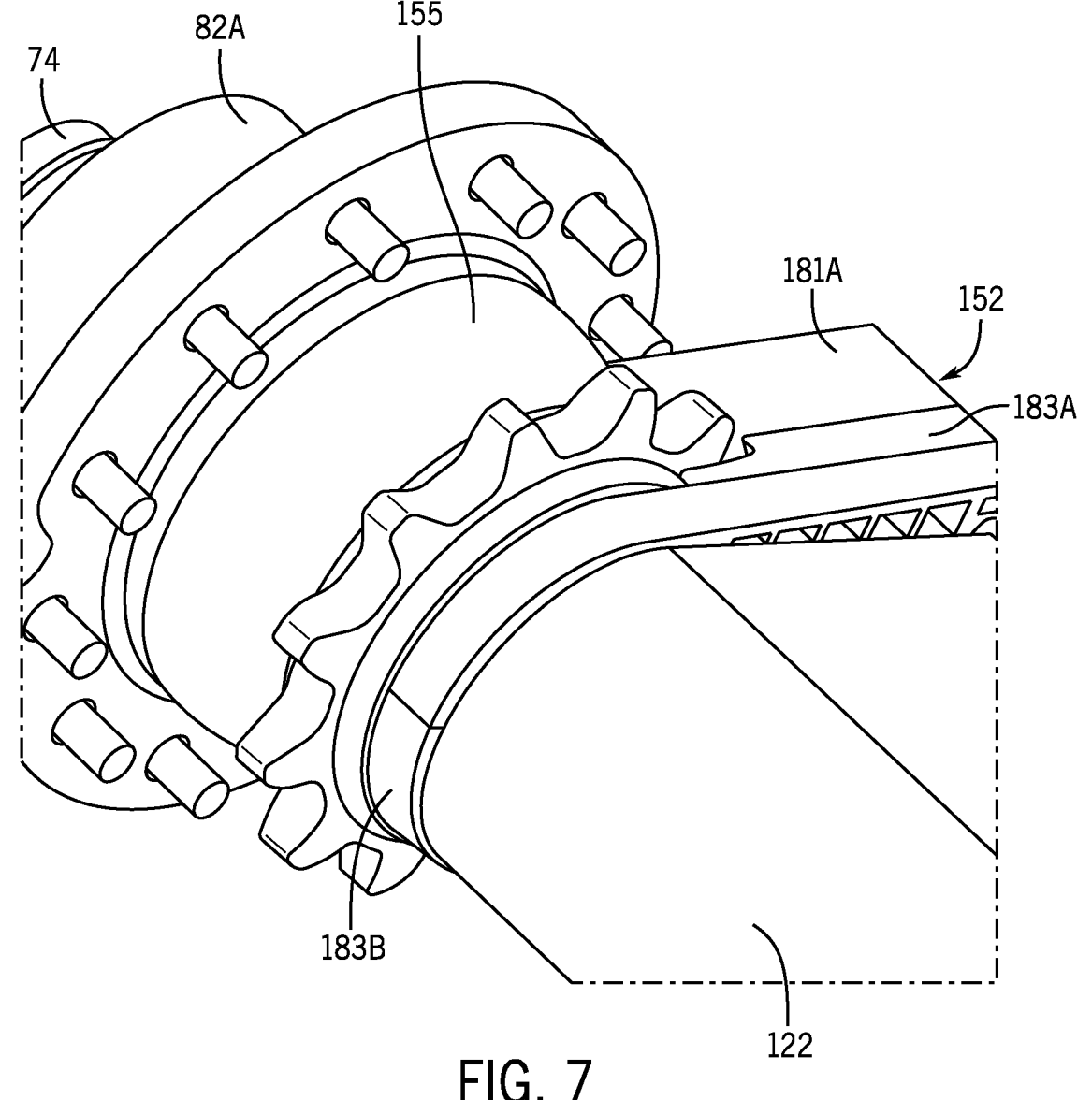
FIG. 7 is a partial and isometric view of the feeder of FIG. 2 taken along the lines 7-7 in FIG. 2 and with various components omitted for clarity, with the exception that FIG. 7 depicts an alternative shield assembly.
Figure 8:
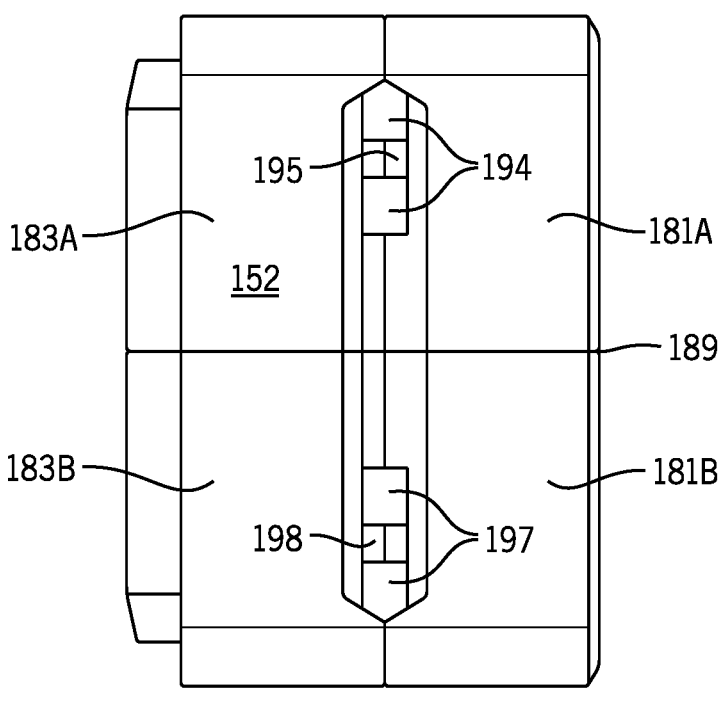
FIG. 8 is a rear end view of the alternative shield assembly of FIG. 7.
Figure 9:
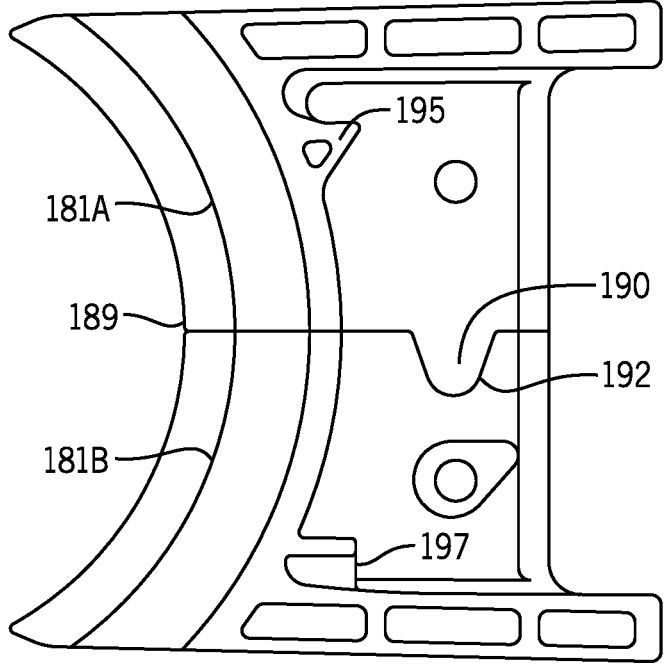
FIG. 9 is a side elevation view of one half of the alternative shield assembly of FIG. 8.

Referring now to shield assemblies 152 shown in FIGS. 7-9, shield assembly 152 is positioned adjacent bearing 82A. Although not shown, a similar shield assembly is also positioned adjacent bearing 82B. Shield assembly 152 includes a top left component 181A, a bottom left component 181B, a top right component 183A, and a bottom right component 183B. Components 181A and 183A may be substantial mirror images of each other along a vertical mirror plane, and, similarly, components 181B and 183B may be substantial mirror images of each other along a vertical mirror plane. Also, components 181A and 181B may be substantial mirror images of each other along a horizontal mirror plane, and, similarly, components 183A and 183B may be substantial mirror images of each other along a horizontal mirror plane.

The top right component 183A and bottom right component 183B are substantially similar to components 153A and 153B, respectively. Although not shown, tie straps mount the components 183A and 183B together, in the same manner as the tie straps described above.

The top left and bottom left components 181A and 181B do not extend about the entire diameter of shaft 74 due to the existence of a labyrinth sealing ring 155 that is sandwiched between the sprocket 76 and the bearing 82A. The labyrinth sealing ring 155 prevents or limits crop material from accumulating in the housing of bearing 82A. The top left and bottom left components 181A and 181B also do not include hinge joints 160.

It should be understood that, on the other side of the shaft 74, the top right and bottom right components 183A/183B on the shield assembly 152 that is positioned against bearing 82B do not do not extend about the entire diameter of the sprocket 76 on that side due to the existence of a labyrinth sealing ring 155 that is sandwiched between sprocket 76 and the bearing 82B. However, for the shield assembly 152 that is adjacent bearing 82B, the top left and bottom left components 181A/181B do extend about the entire diameter of sprocket 76.

The top left and bottom left components 181A/181B are mated together at a horizontal mating interface 189. Top left component 181A includes a rounded projection 190 that extending in a vertical direction and is positioned within a complimentary shaped recess 192 defined in the bottom left component 181B. The projection 190 and recess 192 are arranged at mating interface 189. Engagement between the projection 190 and recess 192 either limits or prevents relative rotation between the components 181A and 181B.

The top right component 183A includes opposing projections 194 which extend in a transverse direction, and a recess defined between those projections 194. The top left component 181A includes a single triangular-shaped projection 195 that is seated in the recess defined between the projections 194 of the top right component 183A. Similarly, the bottom left component 181B includes opposing projections 197 which extend in a transverse direction, and a recess defined between those projections 197. The bottom right component 183B includes a single triangular-shaped projection 198 (like projection 195) that is seated in the recess defined between the projections 197 of the bottom left component 181B. Taken together, inter-engagement between all of the aforementioned pairs of projections assist in holding the shield assembly 152 together.

This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A feederhouse for an agricultural vehicle, said feederhouse comprising:
  an assembled driveshaft comprising a shaft and at least one sprocket that is rotationally fixed to said shaft;
  a shield assembly is positioned adjacent the sprocket, wherein the shield assembly comprises two components including a top component and a bottom component, wherein the top component includes a first mating surface and a first wall, wherein the bottom component includes a second mating surface and a second wall, wherein when the two components are connected together by joining the first mating surface to the second mating surface, the two components form a first opening through which the shaft is positioned; and
  a bearing component that is configured to bear on both the first wall and the second wall for urging the first mating surface toward the second mating surface in order to limit the top component from separating from the bottom component.

2. The feederhouse of claim 1, wherein the top component constitutes a top right component, and the bottom component constitutes a bottom right component, and the shield assembly further comprises a top left component and a bottom left component, wherein the top left component includes a third mating surface and the bottom left component includes a fourth mating surface, wherein when the top left and bottom left components are connected together by joining the third mating surface to the fourth mating surface, the top left and bottom left components form a second opening through which the shaft is positioned.

3. The feederhouse of claim 2, further comprising a first fastener that passes through holes in the top left and right components and the bearing component, and a second fastener that passes through holes in the bottom left and right components and the bearing component to secure the four components together.

4. The feederhouse of claim 2, wherein each component includes a side surface, and wherein the side surface of the top right component is mated against the side surface of the top left component, and the side surface of the bottom right component is mated against the side surface of the bottom left component, and the shield assembly further comprises a recess formed between the side surfaces for accommodating the sprocket.

5. The feederhouse of claim 1, wherein the top component includes one of a projection and a recess, and the bottom component includes the other of the projection and the recess, and wherein the projection is configured to mate with the recess to limit the top component from separating from the bottom component.

6. The feederhouse of claim 1, wherein a first internal acute angle is defined between the first wall and the first mating surface, and a second internal acute angle is defined between the second wall and the second mating surface.

7. The feederhouse of claim 1, wherein an external angle that is greater than 180 degrees is defined between the first wall and the second wall.

8. The feederhouse of claim 1, wherein the first wall intersects the first mating surface, and the second wall intersects the second mating surface.

9. The feederhouse of claim 1, wherein the first wall is spaced apart from the first mating surface, and the second wall is spaced apart from the second mating surface.

10. The feederhouse of claim 1, wherein the first and second mating surfaces are arranged along a horizontal plane.

11. The feederhouse of claim 1, wherein the first opening is either a complete circular opening or a semi-circular opening.

12. The feederhouse of claim 1, wherein the sprocket includes a body, a hub extending transversely from the body, and a series of teeth that are arranged about a perimeter of the body, and wherein the shield assembly is positioned adjacent the hub.

13. The feederhouse of claim 1, further comprising a frame comprising opposing side walls, wherein the assembled driveshaft is either directly or indirectly mounted to the opposing side walls.

14. An agricultural vehicle comprising the feederhouse of claim 1.

15. A combine harvester comprising the feederhouse of claim 1.

* * * * *